US012662383B2

(12) United States Patent
Koyanagi et al.

(10) Patent No.: US 12,662,383 B2
(45) Date of Patent: Jun. 23, 2026

(54) CONDUCTIVE TWO-DIMENSIONAL PARTICLE AND METHOD FOR PRODUCING THE SAME

(71) Applicant: Murata Manufacturing Co., Ltd., Nagaokakyo (JP)

(72) Inventors: Masashi Koyanagi, Nagaokakyo (JP); Akimaro Yanagimachi, Nagaokakyo (JP); Hiroki Sakamoto, Nagaokakyo (JP); Hajime Shimizu, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 599 days.

(21) Appl. No.: 18/175,996

(22) Filed: Feb. 28, 2023

(65) Prior Publication Data

US 2023/0227317 A1    Jul. 20, 2023
US 2024/0034634 A9    Feb. 1, 2024

Related U.S. Application Data

(63) Continuation of application No. PCT/JP2021/030833, filed on Aug. 23, 2021.

(30) Foreign Application Priority Data

Sep. 2, 2020    (JP) ................................. 2020-147674

(51) Int. Cl.
*H01B 1/04*        (2006.01)
*C01B 32/90*        (2017.01)
(Continued)

(52) U.S. Cl.
CPC ................ *C01B 32/90* (2017.08); *C08K 3/14* (2013.01); *H01B 1/04* (2013.01); *H01B 1/20* (2013.01);
(Continued)

(58) Field of Classification Search
CPC .. H01B 1/04; H01B 1/24; C01B 32/90; C01B 32/921; C08K 3/14
See application file for complete search history.

(56) References Cited

U.S. PATENT DOCUMENTS 10,573,768 B2    2/2020    Ghidiu et al.
11,296,243 B2    4/2022    Ghidiu et al.
(Continued)

FOREIGN PATENT DOCUMENTS

CN        107001051 A        8/2017
CN        113260242 A    *    8/2021
(Continued)

OTHER PUBLICATIONS

Form PCT/ISA/237 English language (mailed Oct. 26, 2021).*
(Continued)

*Primary Examiner* — Mark Kopec
(74) *Attorney, Agent, or Firm* — ArentFox Schiff LLP

(57)                ABSTRACT

A conductive two-dimensional particle of a layered material comprising one layer or one layer and plural layers, wherein the layer includes a layer body represented by: $M_mX_n$, and a modifier or terminal T exists on a surface of the layer body, wherein T is at least one selected from the group consisting of a hydroxyl group, a fluorine atom, a chlorine atom, an oxygen atom, or a hydrogen atom; and a monovalent metal ion, wherein the conductive two-dimensional particle does not contain an amine, a total content of chlorine and bromine in the conductive two-dimensional particle is 1,500 ppm by mass or less, and an average value of a major diameter of a two-dimensional surface of the conductive two-dimensional particle is 1.0 μm to 20 μm.

10 Claims, 5 Drawing Sheets

(51) Int. Cl.
    *C08K 3/14*           (2006.01)
    *H01B 1/20*           (2006.01)

(52) U.S. Cl.
    CPC ...... *C01P 2004/03* (2013.01); *C01P 2004/24*
        (2013.01); *C01P 2004/61* (2013.01); *C01P*
      *2004/64* (2013.01); *C08K 2201/001* (2013.01)

(56) References Cited

U.S. PATENT DOCUMENTS

| | | | |
|---|---|---|---|
| 11,692,079 B2 * | 7/2023 | Cho | C09C 3/006 |
| | | | 252/478 |
| 12,015,092 B2 | 6/2024 | Ghidiu et al. | |
| 2014/0162130 A1 | 6/2014 | Barsoum et al. | |
| 2017/0294546 A1 | 10/2017 | Ghidiu et al. | |
| 2020/0176619 A1 | 6/2020 | Ghidiu et al. | |
| 2021/0094831 A1 * | 4/2021 | Barsoum | C01B 32/921 |
| 2022/0181507 A1 | 6/2022 | Ghidiu et al. | |
| 2023/0034579 A1 * | 2/2023 | Barsoum | C01B 32/907 |

FOREIGN PATENT DOCUMENTS

| | | | | |
|---|---|---|---|---|
| WO | 2016049109 A2 | 3/2016 | | |
| WO | WO-2017044262 A1 * | 3/2017 | ............... | H01B 1/20 |
| WO | WO-2023077213 A1 * | 5/2023 | ........... | C01B 32/921 |

OTHER PUBLICATIONS

Dong et al "Ti3C2 MXene-Derived Sodium/Potassium Titanate Nanoribbons for High-Performance Sodium/Potassium Ion Batteries with Enhanced Capacities", DOI: 10.1021/acsnano.7b01165 ACS Nano 2017, 11, 4792-4800.*

Alhabeb et al., "Guidelines for Synthesis and Processing of Two-Dimensional Titanium Carbide (Ti3C2Tx MXene)," Chemistry of Materials, Aug. 2017, vol. 29, pp. 7633-7644.

International Search Report in PCT/JP2021/030833, mailed Oct. 26, 2021, 3 pages.

Szabova et al., "First-principles calculation analysis of cation intercalation in MXene negative electrode," 57th Battery Symposium in Japan, Nov. 28, 2016, p. 92 (cited in International Search Report).

* cited by examiner

CONDUCTIVE TWO-DIMENSIONAL PARTICLE AND METHOD FOR PRODUCING THE SAME

CROSS REFERENCE TO RELATED APPLICATIONS

The present application is a continuation of International application No. PCT/JP2021/030833, filed Aug. 23, 2021, which claims priority to Japanese Patent Application No. 2020-147674, filed Sep. 2, 2020, the entire contents of each of which are incorporated herein by reference.

FIELD OF THE INVENTION

The present invention relates to a conductive two-dimensional particle and a method for producing the same.

BACKGROUND OF THE INVENTION

In recent years, MXene has been attracting attention as a new material having conductivity. MXene is a type of so-called two-dimensional material, and as will be described later, is a layered material in the form of one or plural layers. In general, MXene is in the form of particles (which can include powders, flakes, nanosheets, and the like) of such a layered material.

Currently, various studies are being conducted toward the application of MXene to various electrical devices. For the above application, it is required to further enhance the conductivity of a material containing MXene. As a part of the study, a delamination method of MXene obtained as a multilayered product has been studied.

Non-Patent Document 1 discloses that delamination of a multilayer MXene has been performed by handshaking using TMAOH (tetramethylammonium hydroxide). In addition, Non-Patent Document 1 discloses that delamination of the multilayer MXene has been performed by further performing ultrasonic treatment using DMSO (dimethyl sulfoxide).

Non-Patent Document 1: Guidelines for Synthesis and Processing of Two-Dimensional Titanium Carbide (Ti3C2Tx MXene) Chem. Mater. 2017, 29, 7633-7644

SUMMARY OF THE INVENTION

In the electronic equipment industry and the like, as a part of green procurement, it is required that the total content of chlorine and bromine among halogens is restricted to a certain level or less, that is, "halogen-free". Specifically, the content of chlorine is required to be 900 ppm by mass or less, the content of bromine is required to be 900 ppm by mass or less, and the total content of chlorine and bromine is required to be 1,500 ppm by mass or less.

In Non-Patent Document 1, a single-layer/few-layer MXene containing no chlorine or the like is obtained, but the conductivity of the film formed of MXene obtained in Non-Patent Document 1 is as low as 200 S/cm. The present invention has been made in view of the above circumstances, and an object of the present invention is to provide a conductive two-dimensional particle which has a total content of chlorine and bromine at a certain level or less, is suitable for halogen-free applications, and can form a highly conductive film, and a method for producing a conductive two-dimensional particle.

According to one aspect of the present invention, there is provided a conductive two-dimensional particle of a layered material comprising one layer or one layer and plural layers, wherein the layer includes a layer body represented by:

$$M_mX_n$$

wherein M is at least one metal of Group 3, 4, 5, 6, or 7,
X is a carbon atom, a nitrogen atom, or a combination thereof,
n is 1 to 4, and
m is more than n and 5 or less, and
a modifier or terminal T exists on a surface of the layer body, wherein T is at least one selected from the group consisting of a hydroxyl group, a fluorine atom, a chlorine atom, an oxygen atom, or a hydrogen atom; and
a monovalent metal ion,
wherein
the conductive two-dimensional particle does not contain an amine, a total content of chlorine and bromine in the conductive two-dimensional particle is 1,500 ppm by mass or less, and
an average value of a major diameter of a two-dimensional surface of the conductive two-dimensional particle is 1.0 μm to 20 μm.

According to another aspect of the present invention, there is provided a method for producing a conductive two-dimensional particle, the method comprising:
(a) preparing a precursor represented by:

$$M_mAX_n$$

wherein M is at least one metal of Group 3, 4, 5, 6, or 7,
X is a carbon atom, a nitrogen atom, or a combination thereof,
A is at least one metal of Group 12, 13, 14, 15, or 16,
n is 1 to 4, and
m is more than n and 5 or less;
(b1) etching the A atoms from the precursor and performing a first intercalation treatment of a monovalent metal ion using an etching solution containing a metal compound containing monovalent metal ions; and
(d) performing a second intercalation treatment using an organic compound having a Hildebrand dissolution parameter of 19.0 $MPa^{1/2}$ to 47.8 $MPa^{1/2}$.

According to a further aspect of the present invention, there is provided a method for producing a conductive two-dimensional particle, the method comprising:
(a) preparing a precursor represented by:

$$M_mAX_n$$

wherein M is at least one metal of Group 3, 4, 5, 6, or 7,
X is a carbon atom, a nitrogen atom, or a combination thereof,
A is at least one metal of Group 12, 13, 14, 15, or 16,
n is 1 to 4, and
m is more than n and 5 or less;
(b2) etching the A atoms from the precursor using an etching solution;
(c) performing a first intercalation treatment of a monovalent metal ion using a metal compound containing monovalent metal ions; and
(d) performing a second intercalation treatment using an organic compound having a Hildebrand dissolution parameter of 19.0 $MPa^{1/2}$ to 47.8 $MPa^{1/2}$.

According to the present invention, there is provided a conductive two-dimensional particle which is formed of a predetermined layered material (also referred to as "MXene" in the present specification), contains a monovalent metal ion, in which an amine is not contained, a total content of chlorine and bromine is 1,500 ppm by mass or less, and an average value of major diameters of two-dimensional surfaces of the conductive two-dimensional particle is 1.0 μm to 20 μm. With this, the conductive two-dimensional particle contains MXene, is suitable for halogen-free applications, and is capable of forming a highly conductive film. In addition, according to the present invention, the conductive two-dimensional particle can be produced by performing intercalation treatment of a monovalent metal ion using a metal compound containing monovalent metal ions at the time of etching a predetermined precursor or after etching a predetermined precursor, and performing intercalation treatment of an organic compound using the organic compound having a Hildebrand dissolution parameter of 19.0 MPa$^{1/2}$ to 47.8 MPa$^{1/2}$.

DETAILED DESCRIPTION OF EMBODIMENTS OF THE INVENTION

Embodiment 1: Conductive Two-Dimensional Particle

Figure 1:
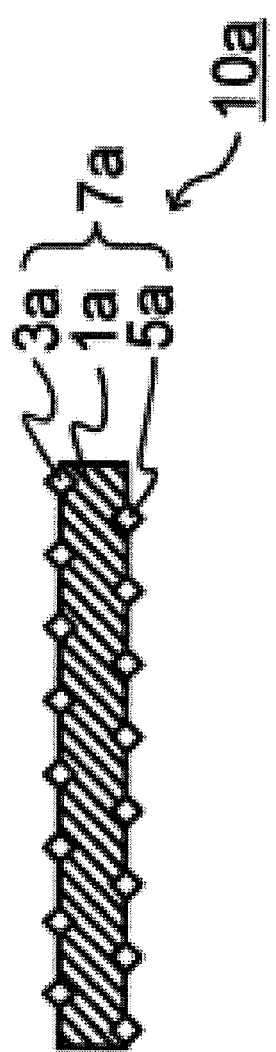
FIG. 1 is a schematic cross-sectional view illustrating a single-layer MXene that is a layered material according to one embodiment of the present invention.

Hereinafter, a conductive two-dimensional particle in one embodiment of the present invention will be described in detail, but the present invention is not limited to such an embodiment.

The conductive two-dimensional particle in the present embodiment is the conductive two-dimensional particle of a layered material comprising one layer or one layer and plural layers, wherein the layer includes a layer body (the layer body may have a crystal lattice in which each X is located in an octahedral array of M) represented by:

$$M_mX_n$$

wherein M is at least one metal of Group 3, 4, 5, 6, or 7,
X is a carbon atom, a nitrogen atom, or a combination thereof,
n is 1 to 4, and
m is more than n and 5 or less, and
a modifier or terminal T exists on a surface (more particularly, at least one of the two opposing surfaces of the layer body) of the layer body, wherein T is at least one selected from the group consisting of a hydroxyl group, a fluorine atom, a chlorine atom, an oxygen atom, or a hydrogen atom.
The layered material can be understood as a layered compound and is also denoted by "$M_mX_nT_s$", in which s is an optional number, and in the related art, x or z may be used instead of s. Typically, n can be 1, 2, 3, or 4, but is not limited thereto.

In the above formula of MXene, M is preferably at least one selected from the group consisting of Ti, Zr, Hf, V, Nb, Ta, Cr, Mo, or Mn, and more preferably at least one selected from the group consisting of Ti, V, Cr, or Mo.

MXenes whose above formula $M_mX_n$ is expressed as below are known:

$Sc_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $Mo_{1.3}C$, $Cr_{1.3}C$, $(Ti,V)_2C$, $(Ti,Nb)_2C$, $W_2C$, $W_{1.3}C$, $Mo_2N$, $Nb_{1.3}C$, $Mo_{1.3}Y_{0.6}C$ (in the above formula, "1.3" and "0.6" mean about 1.3 (=4/3) and about 0.6 (=2/3), respectively.), $Ti_3C_2$, $Ti_3N_2$, $Ti_3(CN)$, $Zr_3C_2$, $(Ti,V)_3C_2$, $(Ti_2Nb)C_2$, $(Ti_2Ta)C_2$, $(Ti_2Mn)C_2$, $Hf_3C_2$, $(Hf_2V)C_2$, $(Hf_2Mn)C_2$, $(V_2Ti)C_2$, $(Cr_2Ti)C_2$, $(Cr_2V)C_2$, $(Cr_2Nb)C_2$, $(Cr_2Ta)C_2$, $(Mo_2Sc)C_2$, $(Mo_2Ti)C_2$, $(Mo_2Zr)C_2$, $(Mo_2Hf)C_2$, $(Mo_2V)C_2$, $(Mo_2Nb)C_2$, $(Mo_2Ta)C_2$, $(W_2Ti)C_2$, $(W_2Zr)C_2$, $(W_2Hf)C_2$, $Ti_4N_3$, $V_4C_3$, $Nb_4C_3$, $Ta_4C_3$, $(Ti,Nb)_4C_3$, $(Nb,Zr)_4C_3$, $(Ti_2Nb_2)C_3$, $(Ti_2Ta_2)C_3$, $(V_2Ti_2)C_3$, $(V_2Nb_2)C_3$, $(V_2Ta_2)C_3$, $(Nb_2Ta_2)C_3$, $(Cr_2Ti_2)C_3$, $(Cr_2V_2)C_3$, $(Cr_2Nb_2)C_3$, $(Cr_2Ta_2)C_3$, $(Mo_2Ti_2)C_3$, $(Mo_2Zr_2)C_3$, $(Mo_2Hf_2)C_3$, $(Mo_2V_2)C_3$, $(Mo_2Nb_2)C_3$, $(Mo_2Ta_2)C_3$, $(W_2Ti_2)C_3$, $(W_2Zr_2)C_3$, $(W_2Hf_2)C_3$, $(Mo_{2.7}V_{1.3})C_3$ (in the above formula, "2.7" and "1.3" mean about 2.7 (=8/3) and about 1.3 (=4/3), respectively.)

Typically, in the above formula, M can be titanium or vanadium and X can be a carbon atom or a nitrogen atom. For example, the MAX phase is $Ti_3AlC_2$ and MXene is $Ti_3C_2T_s$ (in other words, M is Ti, X is C, n is 2, and m is 3).

It is noted that, in the present invention, MXene may contain remaining A atoms at a relatively small amount, for example, at 10 mass % or less with respect to the original amount of A atoms. The remaining amount of A atoms can be preferably 8 mass % or less, and more preferably 6 mass % or less. However, even if the residual amount of A atoms exceeds 10 mass %, there may be no problem depending on the application and use conditions of the conductive two-dimensional particle.

In the present specification, the conductive two-dimensional particle (MXene two-dimensional particle) refers to a particle formed of the MXene and having a ratio of (average value of major diameters of two-dimensional surfaces of MXene two-dimensional particles)/(average value of thicknesses of MXene two-dimensional particles) of 1.2 or more, preferably 1.5 or more, and more preferably 2 or more. The average value of the major diameters of the two-dimensional surfaces of the MXene two-dimensional particles and the average value of the thicknesses of the MXene two-dimensional particles may be obtained by a method to be described later.

The conductive two-dimensional particle of the present embodiment is an aggregate containing one layer of MXene 10a (single-layer MXene) schematically illustrated in FIG. 1. More specifically, MXene 10a is an MXene layer 7a having layer body ($M_mX_n$ layer) 1a represented by $M_mX_n$, and modifier or terminals T3a and 5a existing on the surface (more specifically, at least one of two surfaces facing each other in each layer) of the layer body 1a. Therefore, the MXene layer 7a is also represented as "$M_mX_nT_s$", and s is an optional number.

Figure 2:
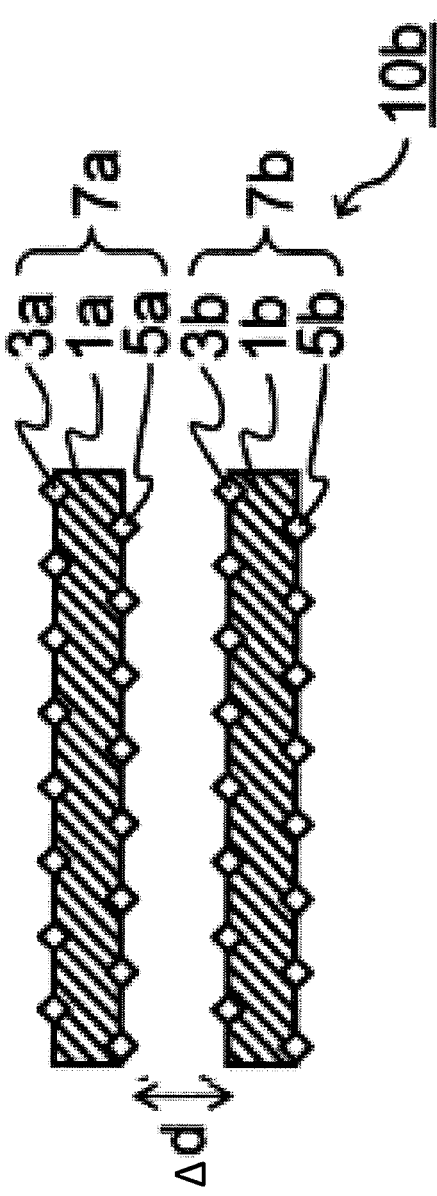
FIG. 2 is a schematic cross-sectional view illustrating a multilayer MXene that is a layered material according to one embodiment of the present invention.

The conductive two-dimensional particle of the present embodiment may include one layer or plural layers. Examples of the MXene (multilayer MXene) of the plural layers include, but are not limited to, two layers of MXene 10b as schematically illustrated in FIG. 2. 1b, 3b, 5b, and 7b in FIG. 2 are the same as 1a, 3a, 5a, and 7a in FIG. 1 described above. Two adjacent MXene layers (for example, 7a and 7b) of the multilayer MXene do not necessarily have to be completely separated from each other, and may be partially in contact with each other. The MXene 10a may be a mixture of the single-layer MXene 10a and the multilayer MXene 10b, in which the multilayer MXene 10b is individually separated and exists as one layer and the unseparated multilayer MXene 10b remains.

Although the present embodiment is not limited, the thickness of each layer of MXene (which corresponds to the MXene layers 7a and 7b) is, for example, 0.8 nm to 5 nm, particularly 0.8 nm to 3 nm (which may mainly vary depending on the number of M atom layers included in each layer). For the individual laminates of the multilayer MXene that can be included, the interlayer distance (or a void dimension indicated by Δd in FIG. 2(b)) is, for example, 0.8 nm to 10 nm, particularly 0.8 nm to 5 nm, and more particularly about 1 nm, and the total number of layers can be 2 to 20,000.

In the conductive two-dimensional particle of the present embodiment, the multilayer MXene that can be included is preferably MXene having a few layers obtained through the delamination treatment. The term "the number of layers is small" means that, for example, the number of stacked layers of MXene is 6 or less. The thickness, in the stacking direction, of the multilayer MXene having a few layers is preferably 10 nm or less. Hereinafter, the "multilayer MXene having a few layers" may be referred to as a "few-layer MXene" in some cases. In addition, the single-layer MXene and the few-layer MXene may be collectively referred to as "single-layer/few-layer MXene" in some cases.

The conductive two-dimensional particle of the present embodiment preferably contains a single-layer MXene and a few-layer MXene, that is, a single-layer/few-layer MXene. In the conductive two-dimensional particle of the present embodiment, the ratio of the single-layer/few-layer MXene having a thickness of 10 nm or less is preferably 90 vol % or more, and more preferably 95 vol % or more.

The conductive two-dimensional particle of the present embodiment contains a monovalent metal ion. Examples of the monovalent metal ion include alkali metal ions such as a lithium ion, a sodium ion, and a potassium ion, a copper ion, a silver ion, and a gold ion. The monovalent metal ion is preferably a lithium ion. The monovalent metal ion is derived from a metal compound containing a monovalent metal ion used in a method for producing conductive two-dimensional particles to be described later. The content of the monovalent metal ion in the conductive two-dimensional particles may be 0.001 mass % to 10 mass %. The content of the monovalent metal ion can be measured by, for example, ICP-AES using inductively coupled plasma emission spectrometry.

The conductive two-dimensional particle of the present embodiment does not contain an amine. As disclosed in Non-Patent Document 1, when the delamination of MXene is performed using TMAOH, the single-layer MXene is obtained, but TMAOH remains on the surface of MXene even after washing, and the conductivity decreases due to this. In order to remove the TMAOH, it is necessary to set a high temperature state of 250° C. or higher and 500° C. or lower, but in the high temperature state, MXene may be oxidized and decomposed. On the other hand, in the present embodiment, TMAOH is not used for the delamination of MXene, and as a result, the resulting conductive two-dimensional particle does not contain an amine. The phrase "does not contain an amine" in the present specification means that triethylamine derived from TMAOH (m/z=42, 53, 54) is 10 ppm by mass or less as measured using a gas chromatography mass spectrometer (GCMS).

The conductive two-dimensional particle of the present embodiment has a total content of chlorine and bromine of 1,500 ppm by mass or less. Since chlorine and bromine are reduced in the conductive two-dimensional particle of the present embodiment, the conductive two-dimensional particle can be applied to applications in which halogen-free is required. The total content of chlorine and bromine is preferably 900 ppm by mass or less, and most preferably 0 ppm by mass or less. That is, in the present disclosure, "the conductive two-dimensional particle has a total content of chlorine and bromine of 1,500 ppm by mass or less" includes those containing substantially no chlorine and bromine.

(Average Value of Major Diameters of Two-Dimensional Surfaces of Conductive Two-Dimensional Particles)

In the conductive two-dimensional particle of the present embodiment, the average value of the major diameters of the two-dimensional surfaces is 1.0 μm to 20 μm. Hereinafter, the average value of the major diameters of the two-dimensional surfaces may be referred to as "average flake size".

The conductivity of the film increases as the average flake size increases. Since the conductive two-dimensional particle of the present embodiment has a large average flake size of 1.0 μm or more, a film formed using the conductive two-dimensional particle, for example, a film obtained by stacking the conductive two-dimensional particles can achieve conductivity of 2,000 S/cm or more. The average value of the major diameters of the two-dimensional surfaces is preferably 1.5 μm or more, and more preferably 2.5 μm or more. In Non-Patent Document 1, the delamination of MXene is performed by subjecting MXene to ultrasonic treatment, but since most of MXene is reduced in diameter to about several hundred nm in major diameter by the ultrasonic treatment, it is considered that the film formed of the single-layer MXene obtained in Non-Patent Document 1 has low conductivity.

The average value of the major diameters of the two-dimensional surfaces is 20 μm or less, preferably 15 μm or less, and more preferably 10 μm or less from the viewpoint of dispersibility in the solution.

As described in examples to be described later, the major diameter of the two-dimensional surface refers to a major diameter when each MXene particle is approximated to an elliptical shape in an electron micrograph, and the average value of the major diameters of the two-dimensional surface refers to a number average of the major diameters of 80 particles or more. As the electron microscope, a scanning electron microscope (SEM) photograph or a transmission electron microscope (TEM) photograph can be used.

The average value of the major diameters of the conductive two-dimensional particles of the present embodiment may be measured by dissolving a conductive film containing the conductive two-dimensional particles in a solvent and dispersing the conductive two-dimensional particles in the solvent. Alternatively, it may be measured from an SEM image of the conductive film.

(Average Value of Thicknesses of Conductive Two-Dimensional Particles)

The average value of the thicknesses of the conductive two-dimensional particles of the present embodiment is preferably 1 nm to 10 nm. The thickness is preferably 7 nm or less and more preferably 5 nm or less. On the other hand, in consideration of the thickness of the single-layer MXene, the lower limit of the thickness of the conductive two-dimensional particle may be 1 nm.

The average value of the thicknesses of the conductive two-dimensional particles is determined as a number average dimension (for example, a number average of at least 40 particles) based on an atomic force microscope (AFM) photograph or a transmission electron microscope (TEM) photograph.

The conductive two-dimensional particle of the present embodiment may contain an organic compound having a Hildebrand dissolution parameter (Hildebrand solubility parameters, also referred to as "SP value") of $19.0 \ MPa^{1/2}$ to $47.8 \ MPa^{1/2}$. As described in detail in the method for producing a conductive two-dimensional particle to be described later, in the production of conductive two-dimensional particles of the present embodiment, an organic compound having a Hildebrand dissolution parameter of $19.0 \ MPa^{1/2}$ to $47.8 \ MPa^{1/2}$ is used as the organic compound used for the intercalation treatment of the organic compound.

Examples of the organic compound include organic compounds having a boiling point of 285° C. or lower and one or more of a carbonyl group, an ester group, an amide group, a formamide group, a carbamoyl group, a carbonate group, an aldehyde group, an ether group, a sulfonyl group, a sulfinyl group, a hydroxyl group, a cyano group, and a nitro group. More specific examples include one or more of methanol (MeOH), ethanol (EtOH), dimethyl sulfoxide (DMSO), propylene carbonate (PC), N methylformamide (NMF), acetone, methyl ethyl ketone (MEK), and tetrahydrofuran (THF).

It is preferable that the organic compound is completely removed by washing after the intercalation treatment of the organic compound, but a small amount of the organic compound may remain to the extent that securing of conductivity is not hindered. The content of the organic compound is preferably 0 mass % when the conductive two-dimensional particle of the present embodiment is measured by gas chromatography mass spectrometry, and is, for example, more than 0 mass % and 0.01 mass % or less even when a small amount remains.

Embodiment 2: Method for Producing Conductive Two-Dimensional Particle

Hereinafter, a method for producing a conductive two-dimensional particle in one embodiment of the present invention will be described in detail, but the present invention is not limited to such an embodiment.

A method for producing a conductive two-dimensional particle (first production method) according to the present embodiment comprises:

(a) preparing a predetermined precursor;
(b1) etching A atoms from the precursor and performing intercalation treatment of a monovalent metal ion using an etching solution containing a metal compound containing monovalent metal ions; and
(d) performing intercalation treatment of an organic compound using the organic compound having a Hildebrand dissolution parameter of $19.0 \ MPa^{1/2}$ to $47.8 \ MPa^{1/2}$.

Another method for producing a conductive two-dimensional particle (second production method) according to the present embodiment comprises:

(a) preparing a predetermined precursor;
(b2) etching A atoms from the precursor using an etching solution;
(c) performing intercalation treatment of a monovalent metal ion using a metal compound containing monovalent metal ions; and
(d) performing intercalation treatment of an organic compound using the organic compound having a Hildebrand dissolution parameter of $19.0 \ MPa^{1/2}$ to $47.8 \ MPa^{1/2}$.

Hereinafter, each step of the first production method and the second production method will be described in detail. The step (a) and the step (d) common to these two production methods will be collectively described.

Step (a)

First, a predetermined precursor is prepared. A predetermined precursor that can be used in the present embodiment is a MAX phase that is a precursor of MXene, and is represented by:

$$M_mAX_n$$

wherein M is at least one metal of Group 3, 4, 5, 6, or 7,
X is a carbon atom, a nitrogen atom, or a combination thereof,
A is at least one metal of Group 12, 13, 14, 15, or 16,
n is 1 to 4, and
m is more than n and 5 or less.

The above M, X, n, and m are as described in MXene. A is at least one element of Group 12, 13, 14, 15, or 16, is usually a Group A element, typically Group IIIA and Group IVA, more specifically, may include at least one selected from the group consisting of Al, Ga, In, T1, Si, Ge, Sn, Pb, P, As, S, or Cd, and is preferably Al.

The MAX phase has a crystal structure in which a layer constituted by A atoms is located between two layers represented by $M_mX_n$ (each X may have a crystal lattice located in an octahedral array of M). Typically, in the case of m=n+1, the MAX phase has a repeating unit in which one layer of X atoms is disposed between the layers of M atoms of n+1 layers (these layers are also collectively referred to as "$M_mX_n$ layer"), and a layer of A atoms ("A atom layer") is disposed as a next layer of the (n+1) th layer of M atoms; however, the present invention is not limited thereto.

The MAX phase can be produced by a known method. For example, a TiC powder, a Ti powder, and an Al powder are mixed in a ball mill, and the obtained mixed powder is calcined under an Ar atmosphere to obtain a calcined body (block-shaped MAX phase). Thereafter, the calcined body obtained is pulverized by an end mill to obtain a powdery MAX phase for the next step.

Step (b1)

In the first production method, A atoms (and a part of M atoms in some cases) are etched (removed and separated into layers in some cases) from the precursor by using an etching solution containing a metal compound containing monovalent metal ions, and intercalation treatment of the monovalent metal ions is performed.

In the known method using hydrochloric acid, it is considered that Cl⁻ present in the etching solution plays a role of causing steric hindrance. However, in order to achieve the above-mentioned halogen free, a method without using hydrochloric acid is desired. In a method in which the hydrochloric acid is not used for the etching solution, it is difficult to easily form a single layer, and treatment having very strong shearing force such as ultrasonic treatment is required. However, as the single-layer MXene obtained by receiving strong shear force, as described above, in-plane fracture occurs, and only the single-layer MXene having a small two-dimensional surface can be obtained.

In the present embodiment, the intercalation treatment of a monovalent metal ion is performed in which monovalent metal ions are inserted between the layers of the $M_mX_n$ layer at the time of etching (removal and layer separation in some cases) of the A atoms (and a part of the M atoms in some cases) from the MAX phase. It is considered that a monovalent metal ion is inserted between the $M_mX_n$ layers, and the intercalation treatment of an organic compound is further performed in step (d) to be described later, whereby the MXene interlayer distance is sufficiently widened due to steric hindrance, and the van der Waals force between the $M_mX_n$ layers is sufficiently weakened. As a result, it is considered that the $M_mX_n$ layer can be easily formed into a single layer without applying strong shear to the multilayered $M_mX_n$ layer. In addition, since it is not necessary to apply strong shearing, destruction of the $M_mX_n$ layer in a plane is suppressed, and as a result, a single-layer $M_mX_n$ layer having a large two-dimensional surface can be obtained.

Examples of the monovalent metal ions constituting the metal compound containing the monovalent metal ions include, as described, alkali metal ions such as a lithium ion, a sodium ion, and a potassium ion, a copper ion, a silver ion, and a gold ion. Examples of the metal compound containing a monovalent metal ion include an ionic compound in which the metal ion and a cation are bonded. Examples of the metal ions include an iodide, a phosphate, a sulfide salt including a sulfate, a nitrate, an acetate, and a carboxylate. As described above, the monovalent metal ion is preferably a lithium ion, and the metal compound containing a monovalent metal ion is preferably a metal compound containing a lithium ion, that is, a Li-containing compound, more preferably an ionic compound of a lithium ion, and still more preferably one or more of an iodide, a phosphate, and a sulfide salt of a lithium ion. When a lithium ion is used as the metal ion, it is considered that water hydrated to the lithium ion has the most negative dielectric constant, and thus it is easy to form a single layer.

The content of the metal compound containing monovalent metal ions in the etching solution is preferably 0.001 mass % or more. The content is more preferably 0.01 mass % or more, and still more preferably 0.1 mass % or more. On the other hand, from the viewpoint of dispersibility in a solution, the content of the metal compound containing monovalent metal ions in the etching solution is preferably 10 mass % or less and more preferably 1 mass % or less (the same applies to the etching solution in the following step (b2)).

The etching solution does not contain hydrochloric acid used in a known etching solution, that is, does not contain chlorine atoms. The phrase "does not contain chlorine atoms" of etching solution means that the chlorine concentration in the etching solution is, for example, 10 ppm by mass or less as measured by combustion-ion chromatography.

The etching solution in the step (b1) may contain a metal compound containing a monovalent metal ion without containing hydrochloric acid which has been used in the related art, and other configurations of the etching solution are not particularly limited, and known conditions can be adopted. For example, the method can be performed using an etching solution further containing $F^-$, and examples thereof include a method using a mixed solution of a metal compound containing hydrofluoric acid (HF) and a monovalent metal ion and, for example, pure water as a solvent. The concentration of hydrofluoric acid in the mixed solution may be 1 mass % to 50 mass %.

In the etching, only the composition of the etching solution is different from that in the related art, and other etching conditions may be conditions that are performed in the related art.

In the second production method, in place of the step (b1) of the first production method, (b2) etching A atoms from the precursor using an etching solution; and (c) intercalation treatment of a monovalent metal ion using a metal compound containing monovalent metal ions can be performed. According to the production method in which the etching step and the step of intercalation of monovalent metal ions are separated as in the second production method, MXene can be easily formed into a single layer, which is preferable.

Hereinafter, the step (b2) and the step (c) of the second production method will be described, but the description of the portion overlapping with the step (b1) of the first production method will be omitted.

Step (b2)

The etching solution used in the step (b2) is not particularly limited except that the etching solution does not contain hydrochloric acid used in the known etching solution, that is, does not contain chlorine atoms, and known conditions can be adopted. For example, the method can be performed using an etching solution further containing $F^-$, and examples thereof include a method using a mixed solution of hydrofluoric acid (HF), phosphoric acid or the like as another additive as necessary and, for example, pure water as a solvent. The concentration and the like of hydrofluoric acid (HF) in the etching solution can be the same as those in step (b1).

Step (c)

The intercalation treatment of a monovalent metal ion is performed using a metal compound containing monovalent metal ions. The monovalent metal ion and the metal compound containing the monovalent metal ion are as described in the step (b1).

The content of the metal compound containing a monovalent metal ion in the formulation for the intercalation treatment of a monovalent metal ion is preferably 0.001 mass % or more. The content is more preferably 0.01 mass % or more, and still more preferably 0.1 mass % or more. On the other hand, from the viewpoint of dispersibility in a solution, the content of the metal compound containing a monovalent metal ion is preferably 10 mass % or less, and more preferably 1 mass % or less.

In the step (c), for example, a moisture medium clay of MXene obtained by washing the slurry after etching in the step (b2) by repeating centrifugation, removal of the supernatant, addition of pure water to the remaining precipitate, and centrifugation again may be subjected to the intercalation treatment. In the intercalation treatment in the step (c), for example, the formulation for the intercalation treatment of a monovalent metal ion obtained by adding the compound of phosphoric acid or the like used in the etching solution and monovalent metal ions to the moisture medium clay of MXene is stirred at room temperature, for example.

Step (d)

The intercalation treatment of an organic compound is performed using the organic compound having a Hildebrand dissolution parameter of 19.0 $MPa^{1/2}$ to 47.8 $MPa^{1/2}$. By further inserting a highly polar organic compound having a Hildebrand dissolution parameter within the above range into MXene already subjected to the intercalation treatment of a monovalent metal ion in the step (b1) or the step (c), the interlayer of MXene is further widened, and the MXene is easily formed into a single layer. By performing the intercalation treatment of the monovalent metal ions already in the step (b1) or the step (c), it is clearly easier to form a single layer than in a case where monovalent metal ions are not inserted. Therefore, it is possible to form a single layer without applying energy strong enough to cause particle destruction like ultrasonic waves in the delamination treatment. As a result, it is possible to obtain a conductive two-dimensional particle including single-layer/few-layer MXene in which the average value of the major diameters of the two-dimensional surfaces is larger than that in the related art. The conductive two-dimensional particle containing single-layer/few-layer MXene having a large major diameter of the two-dimensional surface can form a film without using a binder, and the obtained film exhibits high conductivity. This effect cannot be easily inferred from the prior art.

The organic compound can be removed without oxidation and decomposition of MXene by performing vacuum heating drying in a subsequent step. Therefore, as in Non-Patent Document 1, a large amount of TMAOH having low conductivity does not remain in MXene, and the film formed of MXene exhibits high conductivity.

Examples of the organic compound include organic compounds having a boiling point of 285° C. or lower and one or more of a carbonyl group, an ester group, an amide group, a formamide group, a carbamoyl group, a carbonate group, an aldehyde group, an ether group, a sulfonyl group, a sulfinyl group, a hydroxyl group, a cyano group, and a nitro group. More specific examples include one or more of methanol (MeOH), ethanol (EtOH), dimethyl sulfoxide (DMSO), propylene carbonate (PC), N methylformamide (NMF), acetone, methyl ethyl ketone (MEK), and tetrahydrofuran (THF).

In the step (d), for example, the moisture medium clay of MXene obtained by centrifuging the slurry after the intercalation treatment of a monovalent metal ion in the step (c) and removing the supernatant is subjected to the intercalation treatment of an organic compound. In the intercalation treatment of the organic compound in the step (d), for example, the formulation for intercalation of an organic compound obtained by adding the organic compound to the moisture medium clay of MXene is stirred at room temperature, for example.

In the formulation for intercalation of an organic compound, the organic compound can be used at a ratio of 0.01 times to 1,000 times with respect to the mass of MXene.

After the intercalation treatment of the organic compound is performed, there is no particular limitation, and a conductive two-dimensional particle can be obtained by a known method. For example, delamination treatment may be performed. In the delamination treatment, for example, the slurry after the intercalation treatment of the organic compound is centrifuged to discard the supernatant, and then pure water is added to the remaining precipitate, for example, stirring-centrifugation-recovery of the supernatant by handshaking is repeated a plurality of times to obtain a conductive two-dimensional particle containing a single-layer/few-layer MXene.

In the production method of the present embodiment, unlike Non-Patent Document 1, ultrasonic treatment is not performed as delamination after etching. As described above, since the ultrasonic treatment is not performed, particle breakage hardly occurs, and it is possible to obtain a conductive two-dimensional particle including single-layer/few-layer MXene having a large two-dimensional surface. The conductive two-dimensional particle containing single-layer/few-layer MXene having a large two-dimensional surface can form a film without using a binder, and the obtained film exhibits high conductivity.

In order to remove the organic compound used in the intercalation treatment of the organic compound from MXene, vacuum heating drying may be performed. In the vacuum heating drying, for example, the supernatant after delamination is dried under vacuum at a temperature of 25° C. or higher and 300° C. or lower to obtain MXene flakes. Alternatively, the MXene slurry may be a dried powder obtained by freeze-drying the MXene slurry, and also in this case, the same effect as the vacuum heating drying can be obtained.

Embodiment 3: Conductive Film

Figure 3:
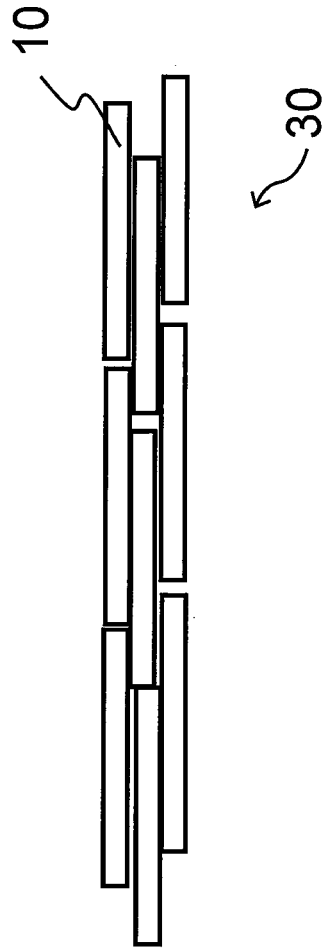
FIG. 3 is a schematic cross-sectional view illustrating a conductive film according to one embodiment of the present invention.

Examples of applications of the conductive two-dimensional particles of the present embodiment include a conductive film containing conductive two-dimensional particles. Referring to FIG. 3, the conductive film of the present embodiment will be described. FIG. 3 illustrates a conductive film 30 obtained by stacking only the conductive two-dimensional particles 10, but the present invention is not limited thereto. The conductive film may contain an additive such as a binder added at the time of film formation as necessary. The additive accounts for preferably 30 vol % or less, more preferably 10 vol % or less, still more preferably 5 vol % or less, and most preferably 0 vol % in terms of a proportion in the conductive film (when dried).

As described above, the conductive film obtained by stacking the conductive two-dimensional particles can preferably achieve the conductivity of 2,000 S/cm or more. The conductivity is more preferably 2,500 S/cm or more and still more preferably 3,000 S/cm or more.

As a method for producing the conductive film without using the binder or the like, the conductive film can be produced by subjecting the supernatant containing the conductive two-dimensional particles obtained by the delamination to suction filtration. The filter is not particularly limited, but a membrane filter or the like can be used. In addition to the suction filtration, a method for applying a supernatant or clay (when the binder and a resin to be described later are contained, the binder and the resin are also contained) containing conductive two-dimensional particles to a substrate to produce a conductive film can be mentioned. Examples of the coating method include a spray coating method in which spray coating is performed using a nozzle such as a one-fluid nozzle, a two-fluid nozzle, or an air brush, a slit coating method using a table coater, a comma coater, or a bar coater, a screen printing method, a metal mask printing method, a spin coating, dip coating, or dropping. After the suction filtration or the application to the substrate, the film is appropriately dried to obtain a conductive film.

Examples of other applications using the conductive two-dimensional particle of the present embodiment include a conductive paste containing the conductive two-dimensional particle, and a conductive composite material containing the conductive two-dimensional particle and a resin. These are also suitable for halogen-free applications and applications requiring high conductivity. Examples of the resin (polymer) include a hydrophilic polymer having a polar group, and those in which the polar group is a group that forms a hydrogen bond with a modifier or terminal T of the layer. Examples of the polymer include one or more polymers selected from the group consisting of water-soluble polyurethane, polyvinyl alcohol, sodium alginate, an acrylic acid-based water-soluble polymer, polyacrylamide, polyaniline sulfonic acid, or nylon. The proportion of the polymer in the conductive composite material film (when dried) may be more than 0 vol % and preferably 30 vol % or less.

The conductive two-dimensional particle according to one embodiments of the present invention has been described in detail through the production methods, but various modifications can be made. It should be noted that the conductive two-dimensional particle according to the present invention may be produced by a method different from the production method in the above-described embodiment, and the method for producing a conductive two-dimensional particle of the present invention is not limited only to one that provides the conductive two-dimensional particle according to the above-described embodiment.

EXAMPLES

Examples 1 to 8

In Examples 1 to 8, five steps of (1) Preparation of precursor (MAX), (2) Etching of precursor and intercalation of Li, (3) Washing, (4) Intercalation of organic compound, and (5) Delamination, which are described in detail below, were sequentially performed to prepare a sample containing single-layer/few-layer MXene.
(1) Preparation of Precursor (MAX)

TiC powder, Ti powder, and Al powder (all manufactured by Kojundo Chemical Laboratory Co., Ltd.) were placed in a ball mill containing zirconia balls at a molar ratio of 2:1:1 and mixed for 24 hours. The obtained mixed powder was calcined in an Ar atmosphere at 1350° C. for 2 hours. The calcined body (block-shaped MAX) thus obtained was pulverized with an end mill to a maximum dimension of 45 μm or less. In this way, $Ti_3AlC_2$ particles were obtained as a precursor (MAX).
(2) Etching of Precursor and Intercalation of Li Using the $Ti_3AlC_2$ particles (powder) prepared by the above method, etching and intercalation of Li were performed together under the following conditions to obtain a solid-liquid mixture (slurry) containing a solid component derived from the $Ti_3AlC_2$ powder.

(Conditions of Etching and Intercalation of Li)
Precursor: $Ti_3AlC_2$ (sieving with a mesh size of 45 m)
Etching solution composition: 49% HF 6 mL, $H_2O$ 54 mL, LiI 10.3 g
Amount of precursor input: 3.0 g
Etching container: 100 mL Aiboy
Etching temperature: 35° C.
Etching time: 24 h
Stirrer rotation speed: 400 rpm
(3) Washing The slurry was divided into two portions, each of which was inserted into two 50 mL centrifuge tubes, centrifuged under the condition of 3500 G using a centrifuge, and then the supernatant was discarded. An operation of adding 40 mL of pure water to the remaining precipitate in each centrifuge tube, centrifuging again at 3500 G, and separating and removing the supernatant was repeated 11 times. After final centrifugation, the supernatant was discarded to obtain a $Ti_3C_2T_s$-moisture medium clay as a remaining precipitate.
(4) Intercalation of Organic Compound With respect to the $Ti_3C_2T_s$-moisture medium clay prepared by the above method, in accordance with the following conditions for intercalation of organic compounds, each intercalator shown in Table 1 was added to the $Ti_3C_2T_s$-moisture medium clay, and the mixture was stirred at 20° C. or higher and 25° C. or lower for 10 hours to perform the intercalation of the organic compound.
(Conditions for Intercalation of Organic Compound)
$Ti_3C_2T_s$-moisture medium clay (MXene after washing):
Solid content: 0.75 g
Intercalators of the types shown in Table 1: 30 mL
Intercalation container: 100 mL Aiboy
Temperature: 20° C. or higher and 25° C. or lower (room temperature)
Time: 10 h
Stirrer rotation speed: 800 rpm
(5) Delamination The slurry obtained by the intercalation of the organic compound was charged into a 50 mL centrifuge tube, centrifuged under the condition of 3500 G using a centrifuge, and then the supernatant was discarded. Subsequently, an operation of adding 40 mL of pure water to the remaining precipitate from which the supernatant was removed, stirring the mixture with a shaker for 15 minutes, then centrifuging the mixture at 3500 G, and recovering the supernatant as a single layer/small number of layers MXene-containing liquid was repeated 4 times to obtain a single-layer/few-layer MXene-containing supernatant.

Example 9

In Example 9, after (1) Preparation of precursor (MAX) was performed in the same manner as in Examples 1 to 8, the following eight steps of (2) Etching of precursor, (3) Washing, (4) Intercalation of Li, (5) Washing, (6) Intercalation of organic compound, (7) Delamination, and (8) Recovery of single-layer/few-layer MXene-containing clay were sequentially performed to prepare a single-layer/few-layer MXene-containing sample.
(2) Etching of Precursor Using the $Ti_3AlC_2$ particles (powder) prepared by the above method, etching was performed under the following etching conditions to obtain a solid-liquid mixture (slurry) containing a solid component derived from the $Ti_3AlC_2$ powder.
(Etching Conditions)
Precursor: $Ti_3AlC_2$ (sieving with a mesh size of 45 m)
Etching solution composition: 49% HF 6 mL, $H_2O$ 9 mL, $H_3PO_4$ 45 mL
Amount of precursor input: 3.0 g
Etching container: 100 mL Aiboy
Etching temperature: 35° C.
Etching time: 24 h
Stirrer rotation speed: 400 rpm
(3) Washing The slurry was divided into two portions, each of which was inserted into two 50 mL centrifuge tubes, centrifuged under the condition of 3500 G using a centrifuge, and then the supernatant was discarded. An operation of adding 40 mL of pure water to the remaining precipitate in each centrifuge tube, centrifuging again at 3500 G, and separating and removing the supernatant was repeated 11 times. After final centrifugation, the supernatant was discarded to obtain a $Ti_3C_2T_s$-moisture medium clay as a remaining precipitate.
(4) Intercalation of Li With respect to the $Ti_3C_2T_s$-moisture medium clay prepared by the above method, in accordance with the following conditions for intercalation of Li, by using $Li_3PO_4$ as a metal compound containing a monovalent metal ion, the mixture was stirred at 20° C. or higher and 25° C. or lower for 10 hours to perform the intercalation of the Li.

(Conditions of Intercalation of Li)

$Ti_3C_2T_s$-moisture medium clay (MXene after washing): Solid content: 0.75 g

Li$_3$PO$_4$: 0.68 g

H$_3$PO$_4$: 3.14 mL

Pure water: 32 mL

Intercalation container: 100 mL Aiboy

Temperature: 20° C. or higher and 25° C. or lower (room temperature)

Time: 10 h

Stirrer rotation speed: 800 rpm (5) Washing

The slurry obtained by intercalation of Li was charged into a 50 mL centrifuge tube, centrifuged under the condition of 3500 G using a centrifuge, and then the supernatant was discarded to obtain a clay after Li intercalation treatment.

(6) Intercalation of Organic Compound

The clay after the intercalation treatment of Li was stirred at 20° C. or higher and 25° C. or lower for 10 hours using NMF according to the following conditions for intercalation of an organic compound to perform the intercalation of the NMF.

(Conditions for Intercalation of Organic Compound (NMF))

Moisture medium clay after intercalation treatment of Li (MXene after washing): Solid content: 0.75 g NMF (Nmethylformamide): 30 mL Intercalation container: 100 mL Aiboy Temperature: 20° C. or higher and 25° C. or lower (room temperature)

Time: 10 h

Stirrer rotation speed: 800 rpm (7) Delamination

The slurry obtained by the intercalation of the organic compound was charged into a 50 mL centrifuge tube, centrifuged under the condition of 3500 G using a centrifuge, and then the supernatant was discarded. Subsequently, an operation of adding 40 mL of pure water to the remaining precipitate, stirring the mixture with a shaker for 15 minutes, then centrifuging the mixture at 3500 G, and recovering the supernatant as a single layer/small number of layers MXene-containing liquid was repeated 4 times to obtain a single-layer/few-layer MXene-containing supernatant.

(8) Recovery of Single-Layer/Few-Layer MXene-Containing Clay

The supernatant containing the single-layer/few-layer MXene was centrifuged at 4000 G for 2 hours using a centrifuge to precipitate the single-layer/few-layer MXene, thereby obtaining a single-layer/few-layer MXene-containing clay.

Comparative Example 1

In Comparative Example 1, after (1) Preparation of the precursor (MAX) was performed in the same manner as in Examples 1 to 8, with reference to the method described in Non-Patent Document 1, the following six steps of (2) Etching of precursor, (3) Washing, (4) Intercalation of TMAOH, (5) Delamination, and (6) Recovery of single-layer/few-layer MXene-containing clay were sequentially performed to prepare a single-layer/few-layer MXene-containing sample.

(2) Etching of Precursor

Using the $Ti_3AlC_2$ particles (powder) prepared by the above method, etching was performed under the following etching conditions to obtain a solid-liquid mixture (slurry) containing a solid component derived from the $Ti_3AlC_2$ powder.

(Etching Conditions)

Precursor: $Ti_3AlC_2$ (sieving with a mesh size of 45 m)

Etching solution composition: 49% HF 6 mL, H$_2$O 54 mL

Amount of precursor input: 3.0 g

Etching container: 100 mL Aiboy

Etching temperature: 20° C. or higher and 25° C. or lower (room temperature)

Etching time: 24 h

Stirrer rotation speed: 400 rpm (3) Washing

The slurry was divided into two portions, each of which was inserted into two 50 mL centrifuge tubes, centrifuged under the condition of 3500 G using a centrifuge, and then the supernatant was discarded. An operation of adding 40 mL of pure water to the remaining precipitate in each centrifuge tube, centrifuging again at 3500 G, and separating and removing the supernatant was repeated 11 times. After final centrifugation, the supernatant was discarded to obtain a $Ti_3C_2T_s$-moisture medium clay as a remaining precipitate.

(4) Intercalation of TMAOH

With respect to $Ti_3C_2T_s$-moisture medium clay prepared by the above method, in accordance with the following conditions for intercalation of TMAOH, the mixture was stirred at 20° C. or higher and 25° C. or lower for 12 hours to perform the intercalation of the TMAOH by using the TMAOH as an intercalator.

(Conditions of Intercalation of TMAOH)

$Ti_3C_2T_s$-moisture medium clay (MXene after washing): Solid content 1.0 g

TMAOH 5H$_2$O: 1.98 g

Pure water: 100 mL

Intercalation container: 250 mL Aiboy

Temperature: 20° C. or higher and 25° C. or lower (room temperature)

Time: 12 h

Stirrer rotation speed: 800 rpm s(5) Delamination

The slurry obtained by intercalation of TMAOH was divided into two portions, and inserted into two 50 mL centrifuge tubes, respectively, and centrifuged under the condition of 3500 G using a centrifuge to recover a supernatant. An operation of adding 40 mL of pure water to the remaining precipitate in each centrifuge tube, centrifuging again at 3500 G, and recovering the supernatant was repeated 2 times to obtain a single-layer/few-layer MXene-containing supernatant.

(6) Recovery of Single-Layer/Few-Layer MXene-Containing Clay

The supernatant containing the single-layer/few-layer MXene was centrifuged at 3500 G for 1 hour using a centrifuge to precipitate the single-layer/few-layer MXene, thereby obtaining a single-layer/few-layer MXene-containing clay.

Comparative Example 2

In Comparative Example 2, after (1) Preparation of precursor (MAX) was performed in the same manner as in Examples 1 to 8, with reference to the method described in Non-Patent Document 1, the following eight steps of (2) Etching of precursor, (3) Washing, (4) Drying, (5) Intercalation of DMSO, (6) Washing, (7) Delamination, and (8) Recovery of supernatant were sequentially performed to prepare a single-layer/few-layer MXene-containing sample.

(2) Etching of Precursor

Using the Ti₃AlC₂ particles (powder) prepared by the above method, etching was performed under the following etching conditions to obtain a solid-liquid mixture (slurry) containing a solid component derived from the Ti₃AlC₂ powder.

(Etching conditions)

Precursor: Ti₃AlC₂ (sieving with a mesh size of 45 m)

Etching solution composition: 49% HF 30 mL

Amount of precursor input: 3.0 g

Etching container: 100 mL Aiboy

Etching temperature: 20° C. or higher and 25° C. or lower (room temperature)

Etching time: 22 h

Stirrer rotation speed: 400 rpm (3) Washing

The slurry was divided into two portions, each of which was inserted into two 50 mL centrifuge tubes, centrifuged under the condition of 3500 G using a centrifuge, and then the supernatant was discarded. An operation of adding 40 mL of pure water to the remaining precipitate in each centrifuge tube, centrifuging again at 3500 G, and separating and removing the supernatant was repeated 11 times. After final centrifugation, the supernatant was discarded to obtain a $Ti_3C_2T_s$-moisture medium clay as a remaining precipitate.

(4) Drying

The $Ti_3C_2T_s$-moisture medium clay was dried at 100° C. for 22 hours using a vacuum dryer to obtain dry MXene.

(5) Intercalation of DMSO

With respect to dry MXene prepared by the above method, in accordance with the following conditions for intercalation of DMSO, the mixture was stirred at 20° C. or higher and 25° C. or lower for 18 hours to perform the intercalation of the DMSO by using the DMSO as an intercalator.

(Conditions for Intercalation of DMSO)

Dry MXene: Solid content 0.3 g

DMSO: 10 mL

Intercalation container: 100 mL Aiboy

Temperature: 20° C. or higher and 25° C. or lower (room temperature)

Time: 18 h

Stirrer rotation speed: 800 rpm (6) Washing

The slurry obtained by intercalation of DMSO was charged into a 50 mL centrifuge tube, centrifuged under the condition of 3500 G using a centrifuge, and then the supernatant was discarded to obtain a clay after DMSO intercalation treatment.

(7) Delamination

The clay after the DMSO intercalation treatment and 150 mL of pure water were added to 250 mL of Ai-Boy, and ultrasonic waves were applied thereto for 6 hours with an ultrasonic cleaner.

(8) Recovery of Single-Layer/Few-Layer MXene-Containing Supernatant

The ultrasonic treatment liquid was divided into 3 portions, and centrifuged for 5 minutes under the condition of 3500 G using a centrifuge, and then the supernatant was recovered as a single-layer/few-layer MXene-containing supernatant.

[Evaluation]

Using the single-layer/few-layer MXene-containing samples (single-layer/few-layer MXene-containing supernatant or single-layer/few-layer MXene-containing clay) obtained in Examples 1 to 9 and Comparative Examples 1 and 2, measurement of the major diameter and thickness of the two-dimensional surface of MXene, measurement of the chlorine concentration and the bromine concentration in MXene, and detection of an organic intercalator in MXene were performed as described below.

(Measurement of major diameter and thickness of two-dimensional surface of MXene)

Figure 4:
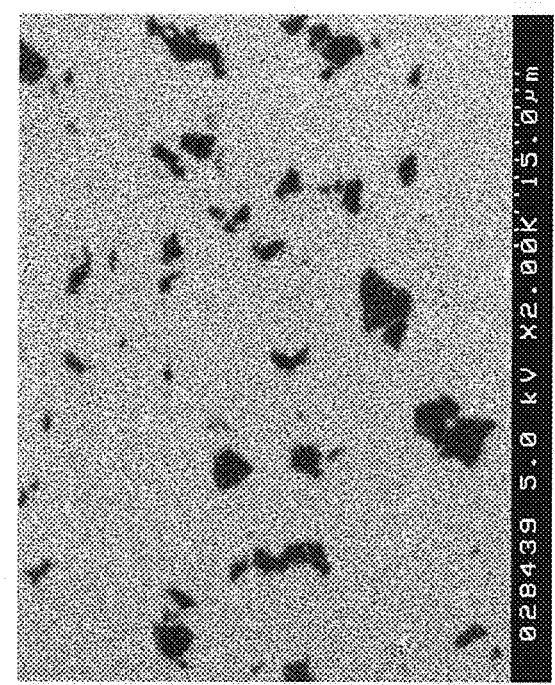
FIG. 4 is a scanning electron micrograph of MXene particles produced in Example 1.

The major diameter (flake size) of the two-dimensional surface of MXene obtained in Example 1 was measured by SEM. Specifically, the MXene slurry was applied to an alumina porous substrate and dried, and a scanning electron microscope (SEM) photograph was taken to perform measurement. Specifically, MXene particles of 80 or more particles that can be visually confirmed in a field of view (about 1 field to 3 fields) of one or more SEM images having a magnification of 2,000 times and a field size of 45 m×45 μm were targeted. When a porous substrate is used as the substrate, fine black spots in the micrograph may be derived from the substrate. The background porous portion was removed by image processing, and thereafter, image analysis was performed using SEM image analysis software "A-Zou Kun" (registered trademark, manufactured by Asahi Kasei Plastics Co., Ltd.). In the image analysis, the major diameter when each MXene particle was approximated to an elliptical shape was obtained, and the number average thereof was taken as the average value of the major diameters of the two-dimensional surface. The measurement results are shown in Table 1. FIG. 4 illustrates a SEM photograph of Example 1. In FIG. 4, the black particles are MXene particles.

In addition, the thickness of MXene of some examples was measured using an atomic force microscope (AFM) of Dimensin FastScan manufactured by Burker Corporation. Specifically, the MXene slurry was applied to a silicon substrate and dried, an atomic force microscope (AFM) photograph was taken, and the thickness was determined from the image. The results are shown in Table 1.

Figure 5:
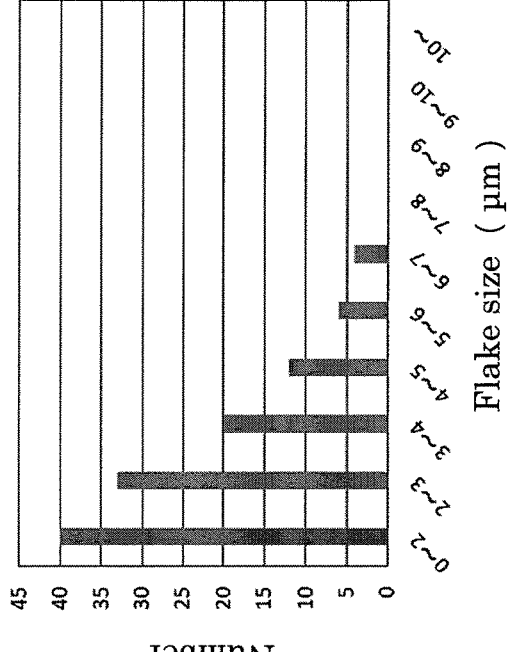
FIG. 5 is a graph illustrating a measurement result of a major diameter (flake size) of a two-dimensional surface of MXene particles produced in Example 2.
Figure 6:
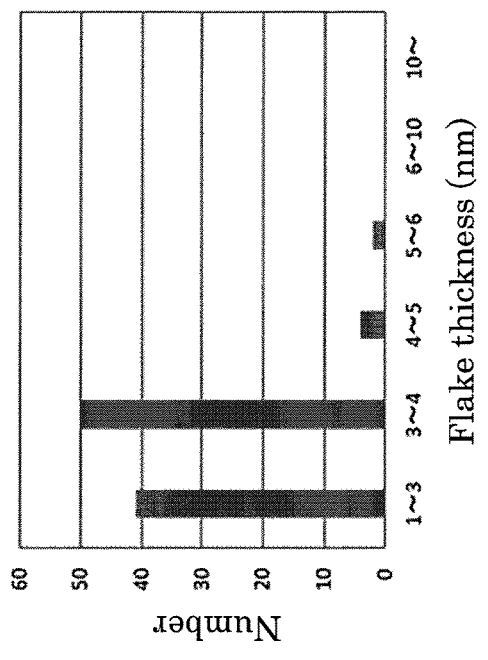
FIG. 6 is a graph illustrating a measurement result of a thickness of the MXene particles produced in Example 2.

In some examples and comparative examples other than Example 1, the major diameter and the thickness of the two-dimensional surface of MXene were measured in the same manner as in Example 1. The results are shown in Table 1. In addition, in other examples, from the high conductivity of the formed film, it is estimated that the average value of major diameters of the two-dimensional surface: 1.0 μm to 20 μm and the average value of thicknesses: 1 nm to 10 nm are satisfied. The results of measuring the major diameter (flake size) of the two-dimensional surface of MXene of Example 2 in the same manner as in Example 1 are illustrated in FIG. 5, and the results of measuring the thickness of MXene of Example 2 are illustrated in FIG. 6. The flake size category on the horizontal axis in FIG. 5, for example, the display of "0 to 2" indicates "more than 0 and 2 or less". In addition, the flake thickness category on the horizontal axis in FIG. 6, for example, the display of "1 to 3" indicates "more than 1 and 3 or less". In FIG. 5, 70% or more of the section of 0 to 2 μm was 1 μm or more.

(Measurement of Chlorine Concentration and Bromine Concentration in MXene)

The chlorine concentration and the bromine concentration in MXene obtained in Example 1 were measured using a combustion ion chromatography apparatus (Dionex ICS-5000) manufactured by Thermo Fisher Scientific. As a result, the chlorine concentration was 50 ppm by mass or less, and the bromine concentration was 50 ppm by mass or less, that is, the total content of chlorine and bromine was 100 ppm by mass or less. It is considered that the chlorine concentration and the bromine concentration in MXene in other examples produced without using hydrochloric acid as in Example 1 were suppressed as in Example 1.

(Detection of Organic Intercalator in MXene)

The presence or absence of a residual organic intercalator of MXene obtained in Examples 1 to 9 was confirmed using a gas chromatography mass spectrometer (GCMS) (Aglient 5975 C) manufactured by Agilent Technologies, Inc. As a result, in Examples 3, 4, 5, and 9, a trace amount of organic intercalators of 10 ppm by mass or less was detected, but in examples other than the above, no organic intercalator was detected.

[Production of MXene film]

The supernatant or clay obtained by the delamination was subjected to suction filtration using MXene of each example. After the filtration, vacuum drying was performed at 80° C. for 24 hours to prepare an MXene film. As a filter for suction filtration, a membrane filter (Durapore, manufactured by Merck KGaA, pore size 0.45 m) was used. The supernatant contained 0.05 g of solid content of MXene two-dimensional particles and 40 mL of pure water. The density and conductivity of the obtained MXene film were measured as follows.

(Measurement of Density of Film)

The film was punched into a disk shape having a diameter of 12 mm with a punch, the mass was measured with an electronic balance, and the thickness was measured with a height gauge. Then, the film density was calculated from these measured values. The results are shown in Table 1.

(Measurement of Conductivity of Film)

The conductivity of the obtained MXene film was determined. For the conductivity, the resistivity ($\Omega$) and the thickness ($\mu$m) were measured at three points per sample, the conductivity (S/cm) was calculated from these measured values, and the average value of three conductivities obtained by this calculation was adopted. For resistivity measurement, the surface resistance of the film was measured by a four-terminal method using a simple low resistivity meter (Loresta AX MCP-T370, manufactured by Mitsubishi Chemical Analytech Co., Ltd.). A micrometer (MDH-25 MB, manufactured by Mitutoyo Corporation) was used for the thickness measurement. Then, the volume resistivity was determined from the obtained surface resistance and film thickness, and the conductivity was determined by taking the reciprocal of the value. The results are shown in Table 1.

TABLE 1

| No. | Types of intercalator | Flake size | | Density of film (g/cm³) | Conductivity of film (S/cm) |
|---|---|---|---|---|---|
| | | Average particle size (μm) | Average thickness (nm) | | |
| Comparative Example 1 | TMAOH | 1.1 | 2.5 | 1.5 | 200 |
| Comparative Example 2 | DMSO + ultrasonic wave | 0.1 | 4.6 | 1.2 | 1000 |
| Example 1 | MeOH | 2.5 | — | 3.2 | 4600 |
| Example 2 | EtOH | 2.7 | 3.0 | 2.8 | 3200 |
| Example 3 | DMSO | 3.0 | — | 2.2 | 3700 |
| Example 4 | PC | — | — | 2.4 | 2900 |
| Example 5 | NMF | — | — | 2.1 | 3400 |
| Example 6 | acetone | — | — | 1.5 | 2100 |
| Example 7 | MEK | 1.5 | 5.2 | 1.8 | 2000 |
| Example 8 | THF | — | — | 2.4 | 3100 |
| Example 9 | NMF | 4.4 | 2.4 | 2.1 | 4900 |

Since the total content of chlorine and bromine in the MXene two-dimensional particles obtained in the present embodiment is 100 ppm by mass or less, the MXene two-dimensional particles can be used for halogen-free applications. In addition, in the MXene two-dimensional particles obtained in the present embodiment, the average value of the major diameters of the two-dimensional surfaces was 1.0 μm or more and the average value of the thicknesses was 10 nm or less from the results in Table 1. In particular, since many MXene two-dimensional particles having a size of 1 μm or more occupy 0 to 2 μm as illustrated in FIG. 5 and described above, most of the MXene two-dimensional particles obtained in the present embodiment have a flake size of 1 μm or more, and have a thickness of 5 nm or less as illustrated in FIG. 6. Therefore, the MXene two-dimensional particles obtained in the present embodiment can be used to prepare a film that can be handled without adding a binder. Furthermore, since the flake size was as large as 1.0 μm or more, a film having high conductivity was obtained as shown in Table 1 above. According to the present embodiment, delamination can be performed by shearing by a shaker without performing ultrasonic treatment, and the used intercalator can be removed or the remaining amount can be suppressed by vacuum drying at a low temperature of 80° C. Therefore, the film formed of the obtained MXene showed high conductivity.

On the other hand, in Comparative Example 1, TMAOH having low conductivity remained in MXene, and the film conductivity decreased. In Comparative Example 2, by performing the ultrasonic treatment, the flake size was reduced, and the film conductivity was lowered.

The conductive film and conductive paste of the present invention can be used in any suitable application, and can be particularly, preferably used, for example, as electrodes in electrical devices.

DESCRIPTION OF REFERENCE SIGNS 1a, 1b: Layer body ($M_mX_n$ layer)

3a, 5a, 3b, 5b: Modifier or terminal T 7a, 7b: MXene layer 10, 10a, 10b: MXene particles (particles of layered material)

30: Conductive film

The invention claimed is:

1. A conductive two-dimensional particle of a layered material comprising one layer or one layer and plural layers, wherein the layer includes a layer body represented by:

$$M_mX_n$$

wherein M is at least one metal of Group 3, 4, 5, 6, or 7,

X is a carbon atom, a nitrogen atom, or a combination thereof, n is 1 to 4, and m is more than n and 5 or less, and a modifier or terminal T existing on a surface of the layer body, wherein T is at least one selected from the group consisting of a hydroxyl group, a fluorine atom, a chlorine atom, an oxygen atom, or a hydrogen atom;

a monovalent metal ion; and an organic compound having a Hildebrand dissolution parameter of 19.0 MPa$^{1/2}$ to 47.8 MPa$^{1/2}$, wherein the conductive two-dimensional particle does not contain an amine, a total content of chlorine and bromine in the conductive two-dimensional particle is 1,500 ppm by mass or less, and an average value of a major diameter of a two-dimensional surface of the conductive two-dimensional particle is 1.0 μm to 20 μm.

2. The conductive two-dimensional particle according to claim 1, wherein an average value of a thickness of the conductive two-dimensional particle is 1 nm to 10 nm.

3. The conductive two-dimensional particle according to claim 2, wherein the monovalent metal ion is a lithium ion.

4. The conductive two-dimensional particle according to claim 1, wherein the monovalent metal ion is a lithium ion.

5. The conductive two-dimensional particle according to claim 1, wherein the organic compound is at least one selected from the group consisting of methanol, ethanol, dimethyl sulfoxide, propylene carbonate, N methylformamide, acetone, methyl ethyl ketone, and tetrahydrofuran.

6. The conductive two-dimensional particle according to claim 1, wherein the monovalent metal ion is an alkali metal ion.

7. The conductive two-dimensional particle according to claim 1, wherein a content of the monovalent metal ion in the conductive two-dimensional particles is 0.001 mass % to 10 mass %.

8. The conductive two-dimensional particle according to claim 1, wherein the total content of the chlorine and the bromine in the conductive two-dimensional particle is 900 ppm by mass or less.

9. A conductive paste comprising the conductive two-dimensional particle according to claim 1.

10. A conductive composite material comprising:

the conductive two-dimensional particle according to claim 1; and a resin.

\* \* \* \* \*